United States Patent
Gelardi

(10) Patent No.: US 6,401,920 B2
(45) Date of Patent: Jun. 11, 2002

(54) MULTIPLE DISC PACKAGE WITH LOCKING AND TAMPER-EVIDENT PUSH BUTTON

(75) Inventor: John A. Gelardi, Kennebunkport, ME (US)

(73) Assignee: AGI Inc., New York, NY (US)

( * ) Notice: Subject to any disclaimer, the term of this patent is extended or adjusted under 35 U.S.C. 154(b) by 0 days.

(21) Appl. No.: 09/839,233

(22) Filed: Apr. 23, 2001

Related U.S. Application Data

(60) Provisional application No. 60/198,735, filed on Apr. 21, 2000.

(51) Int. Cl.$^7$ ................................................ B65D 85/57
(52) U.S. Cl. ................................ 206/308.1; 206/459.5; 206/807
(58) Field of Search ......................... 206/303, 307, 206/308.1, 308.2, 310, 493, 1.5, 459.1, 459.5, 807

(56) References Cited

U.S. PATENT DOCUMENTS

| 5,400,902 | A | * | 3/1995 | Kaminski | .................. 206/310 |
|---|---|---|---|---|---|
| 5,950,822 | A | * | 9/1999 | Cloran et al. | ................ 206/310 |
| 6,041,923 | A | * | 3/2000 | Furutsu | .................... 206/308.1 |
| 6,085,900 | A | * | 7/2000 | Wong | ........................ 206/308.1 |
| 6,170,656 | B1 | * | 1/2001 | Cerda-Vilaplana et al. | ...... 206/308.1 |
| 6,186,322 | B1 | * | 2/2001 | Dautzenberg | ............... 206/310 |
| 6,196,384 | B1 | * | 3/2001 | Belden, Jr. | ................ 206/308.1 |
| 6,227,362 | B1 | * | 5/2001 | Cheung | .................... 206/308.1 |
| 6,250,461 | B1 | * | 6/2001 | Hu | .............................. 206/310 |
| 6,293,396 | B1 | * | 9/2001 | Takahashi et al. | ........... 206/310 |
| 6,311,835 | B1 | * | 11/2001 | Okuhara et al. | .......... 206/308.1 |

* cited by examiner

Primary Examiner—Jim Foster
(74) Attorney, Agent, or Firm—James Creighton Wray; Meera P. Narasimhan

(57) ABSTRACT

Discs are held locked in a tray by flex arms with disc-retaining extensions overlying inner peripheral areas adjacent the central opening of the uppermost disc. A push button is held within a disc-centering boss. Lock tab detents extending from the push button hold the push button above an inner edge of an annular shelf on the centering boss. The push button is connected to the flex arms with goose neck connectors. Pressing inward on the flex arms tends to move the goose necks to draw the push button downward. In the locked, tamper-evident position, the lock tabs prevent the push button from moving downward, and thus hold the disc-retaining extensions over inner surface areas of the disc.

18 Claims, 17 Drawing Sheets

MULTIPLE DISC PACKAGE WITH LOCKING AND TAMPER-EVIDENT PUSH BUTTON

This application claims the benefit of U.S. Provisional Application No. 60/198,735, filed Apr. 21, 2000.

BACKGROUND OF THE INVENTION

SUMMARY OF THE INVENTION

In the improved multiple disc package, a selected number of discs are held locked in a tray by flex arms with disc-retaining extensions overlying inner peripheral areas adjacent the central opening of the uppermost disc. A push button is held within a disc-centering boss. Lock tab detents extending from the push button hold the push button above an inner edge of an annular shelf on the centering boss. The push button is connected to the flex arms with goose neck connectors. Pressing inward on the flex arms tends to move the goose necks to draw the push button downward. In the locked, tamper-evident position, the lock tabs prevent the push button from moving downward, and thus hold the disc-retaining extensions over inner surface areas of the disc.

The goose necks are connected to the flex arms lower than the centers and load the goose necks in compression while the push button is held in the locked position. Trays are formed of a rigid, inexpensive resin such as crystal polystyrene, and have a central raised ledge around the centering boss which extends upward from the center of the tray. A less rigid resilient engineering resin insert snaps into the ledge. The insert is made in four different sizes with four distinct preference surfaces so that the assembled tray and insert hold selectively one to four discs. While snapping the reference surface extensions into the raised ledge under the tray, the locking button is forced upward, snapping its locking detents above the annular inward shoulder.

The bottom of the tray is assembled to the bottom panel of the cover, and the appropriate number of discs is pushed downward on the rounded upper surfaces of the flex arms. The flex arms have flex points above and below the goose neck connections. The flex points above the goose neck connections allow the upper portions of the flex arms to move inward as the discs are pressed downward over the rounded upper surfaces on the flex arm extensions. The ledges on the locking arms extend over the uppermost discs and prevent disc movement during shipping, and provide tamper-evident locking of the discs on the centering boss. When discs are intended to be removed, the push button is pressed downward below the annular shoulder of the boss, and the locking tabs hold the push button there in a neutral down position. That cams the flex arms slightly inward and angles the ledges with respect to the flat upper surfaces of the disc, which allows removal of the disc by camming the ledges and upper ends of the flex arms inward and drawing the button further downward as each disc is removed. Alternatively, the push button may be pushed further downward, pulling the goose neck connectors downward and pulling inward the upper ends of the flex arms, and drawing the ledges within the inner circular openings of the discs as the discs are removed. The discs may be removed all at once and placed in the arcuate depressions on the surface of the tray for sequential use.

The relatively rigid trays may be made and inventoried uniformly, and the engineering resin inserts may be inventoried in configurations to hold from one to four discs. The inserts may be snapped into the trays as they are used.

The inserts provide flexible arms with the retaining extensions, which will not crack, break or lose resilience on repeated uses.

The trays are identical irrespective of the numbers of discs held. Only the inserts are varied.

The inserts may be made in small specialized die areas rather than combining the inserts in the entire tray mold.

A preferred disc package has a rigid tray having a ledge and a central boss extending upward from the ledge for centering discs, an inward extending shoulder on an upper portion of the boss, a flexible insert snapped into the tray, having a body, and having reference surfaces for supporting a fixed number of discs. Flexible arms are connected to the flexible insert and extend upward along the boss. Disc-retaining extensions extend outward from tops of the flexible arms for retaining discs. Connectors extend inward from medial portions of the flexible arms. A push button within the boss is connected to the connectors for up and down movement in the boss. Lock tab detents extend outward from the push button for engaging the inward extending shoulder of the boss.

Preferably the inward extending shoulder has sloped walls for selectively holding the push button in an upward arm locking position and in a downward arm releasing position.

Goose-neck connectors have first flexible connections to medial portions of the arms and extend downward and inward, and having second connections to the push button. Preferably the second connections are flexible.

Outward and downward sloped surfaces on upper surfaces of the disc-retaining extensions and the goose-neck connectors permit inward movement of the arms without unlocking the push buttons when discs are pressed downward on the sloped upper surfaces of the disc-retaining extensions for loading discs on the trays.

Flexible portions of the arms connect to the flexible insert for allowing the arms to tip inward.

A preferred disc package apparatus has a flexible insert for connecting to a tray and having a body, and having reference surfaces for supporting a disc, flexible arms connected to the flexible insert for extending upward along a boss, and disc-retaining extensions extending outward from tops of the flexible arms for retaining discs.

Connectors extend inward from medial portions of the flexible arms, and a push button near the boss is connected to the connectors for up and down movement along the boss.

Lock tab detents extend outward from the push button for engaging an inward extending shoulder of the boss.

The detents have sloped outer walls for selectively holding the push button in an upward arm locking position or in a downward arm releasing position.

A method of holding discs on a tray includes pushing discs downward over sloped upper surfaces on outward extensions of flexible arms, and holding discs downward with lower horizontal surfaces on the extensions. Upper portions of the arms move inward by pushing downward with a first force on a central push button connected to the arms. Initially locking the push button upward in a locking position uses an inward shoulder on a centered boss on the tray. Overcoming a holding force of the shoulder, one pushes downward on the push button with a second force greater than the first force for releasing the locking.

The arms return outward with resilient force from the arms.

The push button returns upward with the resilient force which returns the arms outward.

The shoulder stops the pushing button and prevents its further upward travel beyond the shoulder into the initial locking position of the of the push button.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
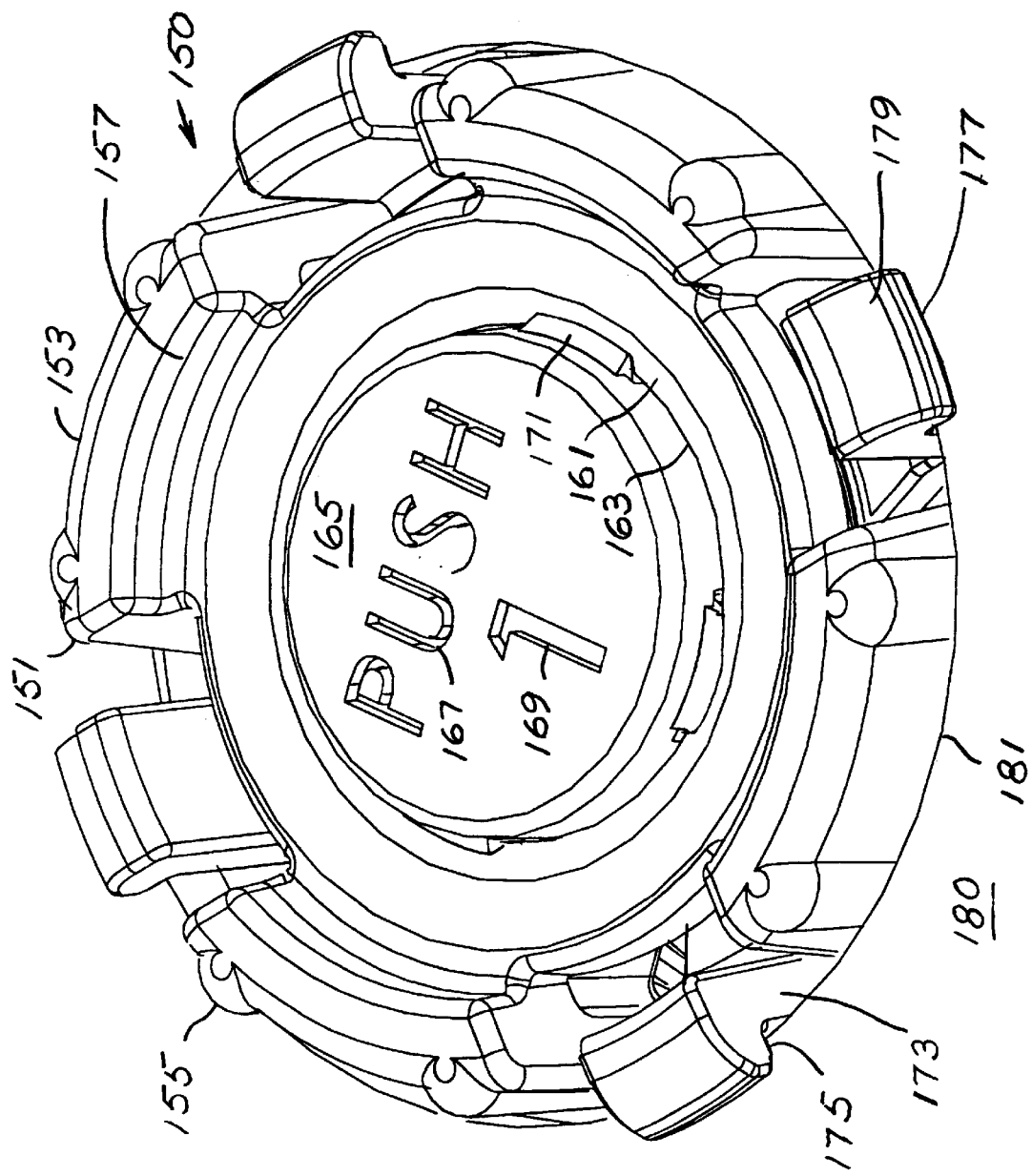
FIG. 1 shows the top of a disc-retaining assembly with a push button in a locked position.

Referring to the drawings, and particularly to FIG. 1, a disc-retaining assembly 150 for a tray has an upward extending boss 151 with laterally spaced segments 153, with semi-cylindrical extensions 155 thereon for centering discs on the boss. The boss 151, segments 153 and cylindrical extensions 155 have a total radius less than the radius of an internal opening in a compact disc or DVD. The boss has the function of centering the discs but not engaging the discs. The segmented sections 153 of the boss are joined by inward extensions 157 to a shelf 159, with a taper 161 leading to an inner edge 163, which forms a shaped opening, for example the circular opening shown in FIG. 1. Centered within the circular edge 163 is a push button 165 with the legend "push" 167 engraved therein, and a number 169 to indicate the number of discs that are to be held on the assembly 150. Lock tab detents 171 engage the sloped surface 161 of the boss shoulder 159 to hold the center button 165 in a forced up position. Flex arms 173, which are connected by goose necks to push button 165, have disc-retaining extensions 175. Outer surfaces 177 are rounded to permit sliding over the discs. Upper surfaces 179 are sloped to urge the flex arms inward as discs are replaced on the assembly. The large surface 180 represents a disc, with 181 being the inner opening in the disc. The upper, locked position of the push button, as shown in FIG. 1, evidences tamper if the push button is on a downward position with the lock tab detents 171 beneath the inner edge 163 of the boss shoulder 159.

Figure 2:
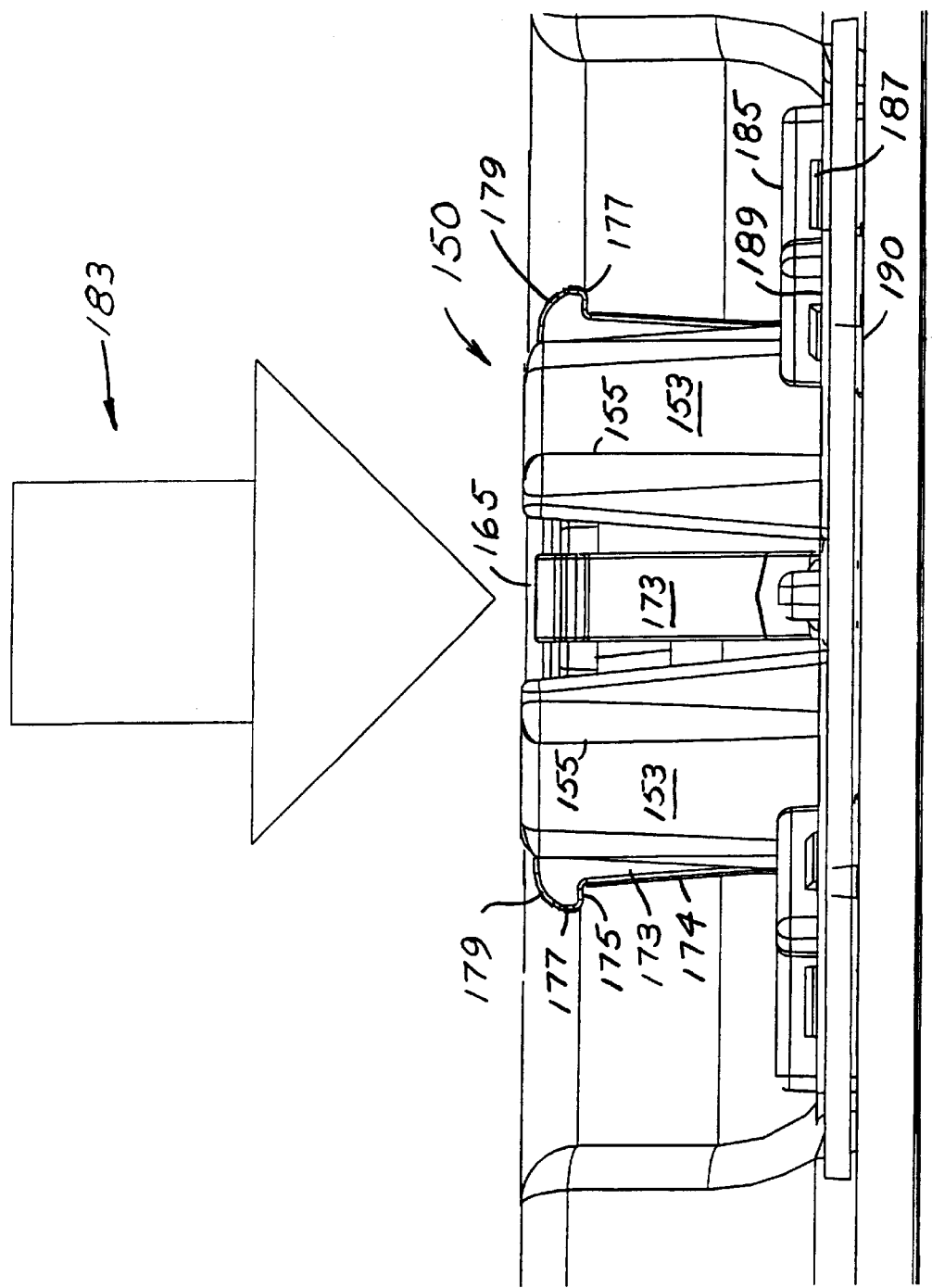
FIG. 2 is a cross-sectional view of the retaining assembly of FIG. 1 showing the flex arms in a locked position with the center button is in a locked position.

FIG. 2 is a cross-sectional representation of the assembly 150 taken through the flex arms 173. The version shown in FIG. 2 is modified to hold four discs.

Figure 3:
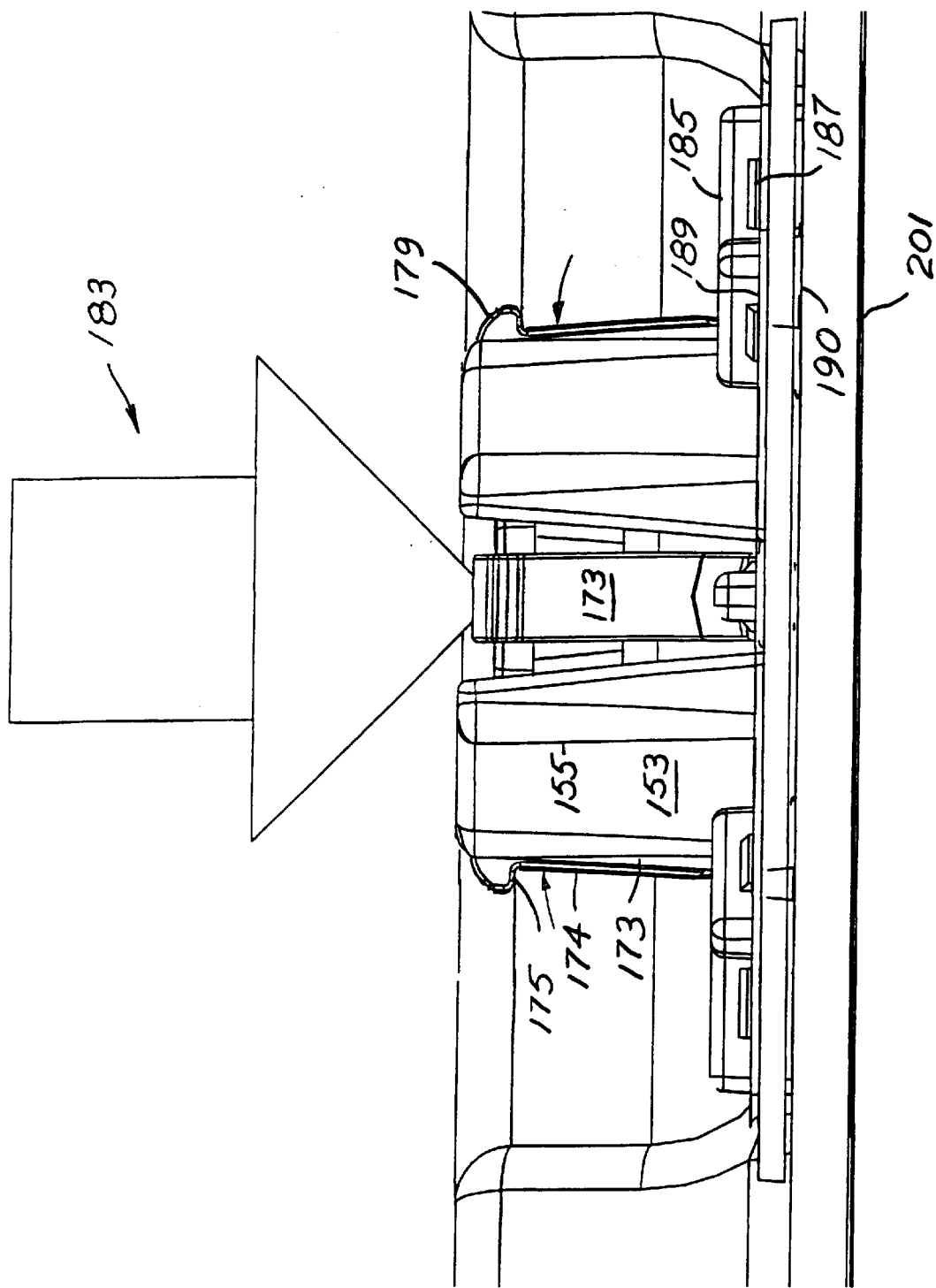
FIG. 3 is a cross-sectional view of the assembly of FIG. 1 showing the push button snapped below a center ledge into an arm locked position, and drawing the retaining arms inward.

Referring to FIG. 2, when a force 183 is applied on the button 165 the button is pushed downward, releasing the flexed arms 173 from their outward disc-locking position, and bringing the outer surfaces 174 to a vertical position, as shown in FIG. 3. At that position, discs may be pulled upward over the slightly inclined ledges 175 and over the rounded ends 177 of the locking arms. Discs may be returned by pushing the disc downward over the sloping upper surfaces 179 and forcing the upper ends of the flex arms 173 inward.

As shown in FIG. 3, the flex arms are ready to release discs in contrast to FIG. 2, in which the flex arms are forced outward when the center button is on the locked position. As shown in FIG. 3, the center button is pushed inward so detents are snapped below the center boss shoulder. That unlocks the flex arms, allowing discs to be removed. The button can be pushed further downward to pull the flex arm ledges 175 further off the disc top surfaces for easier removal of a disc.

Once the button is down, it is unlocked and remains in the down position. In the down position, as shown in FIG. 3, the disc may be pulled past the flex arm ledges 175, which are slightly inclined so that upward pulling on the disc forces the upper ends of the arms inward. The button remains in the unlocked position once pushed downward out of the locked position, providing evidence that the flex arms have been released for disc removal. If the package is being sold in that condition, that provides evidence of tamper.

Both FIGS. 2 and 3 show the engineering plastic insert inserted in the central boss 151 of the tray 190. The bottom reference surface elements 185, which control the number of discs stored on the central boss, have snaps 187 which overlie the upper surface 189 of the tray 190.

Figure 4:
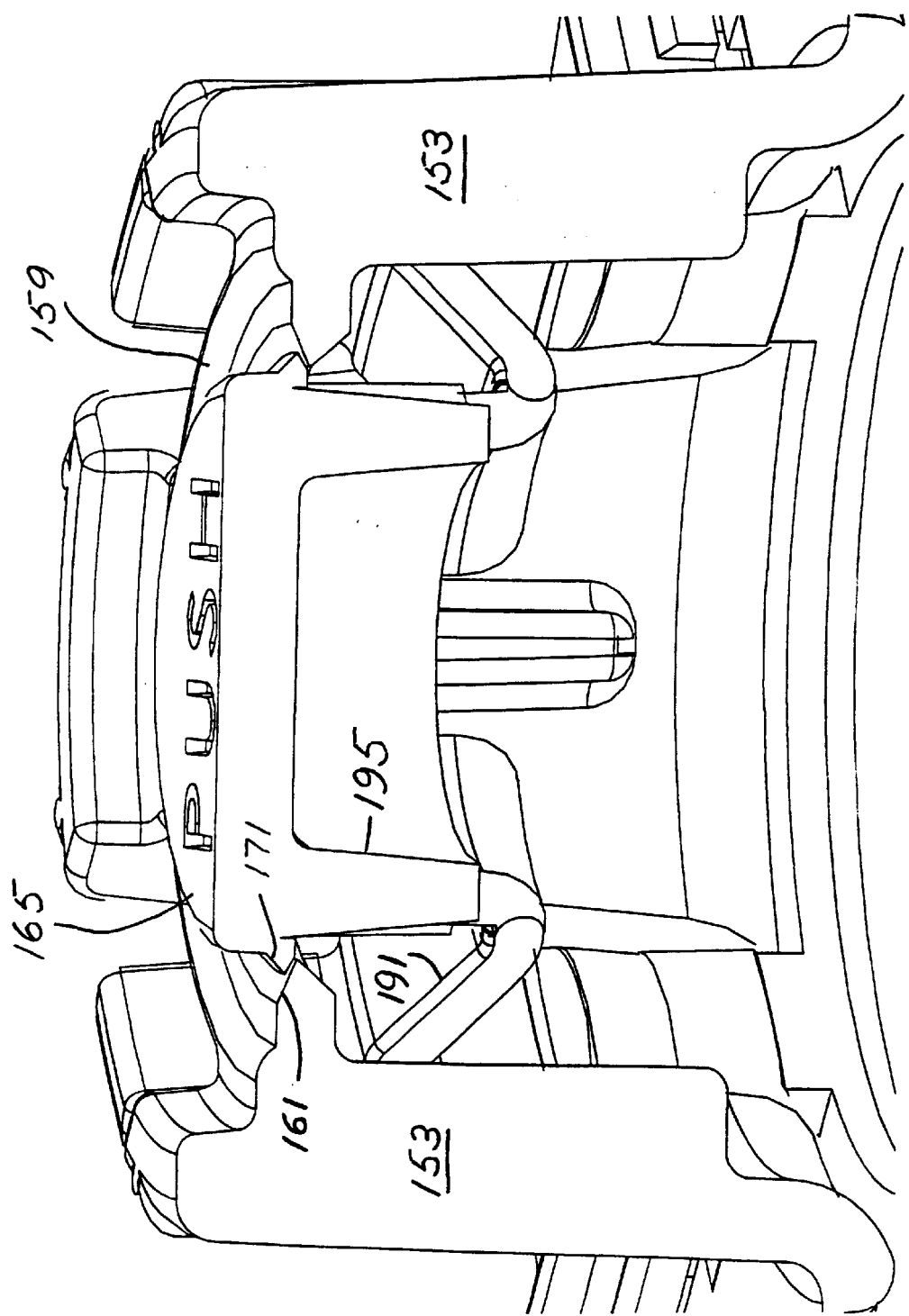
FIG. 4 is a cross-sectional detail through the centering boss showing the push button in an upward locked position.

As configured in FIGS. 3 and 4, the engineering plastic insert provides for four discs. In contrast the configuration shown in FIG. 1 would provide for one disc, since the number one 169 is indicated on the top surface.

Figure 5:
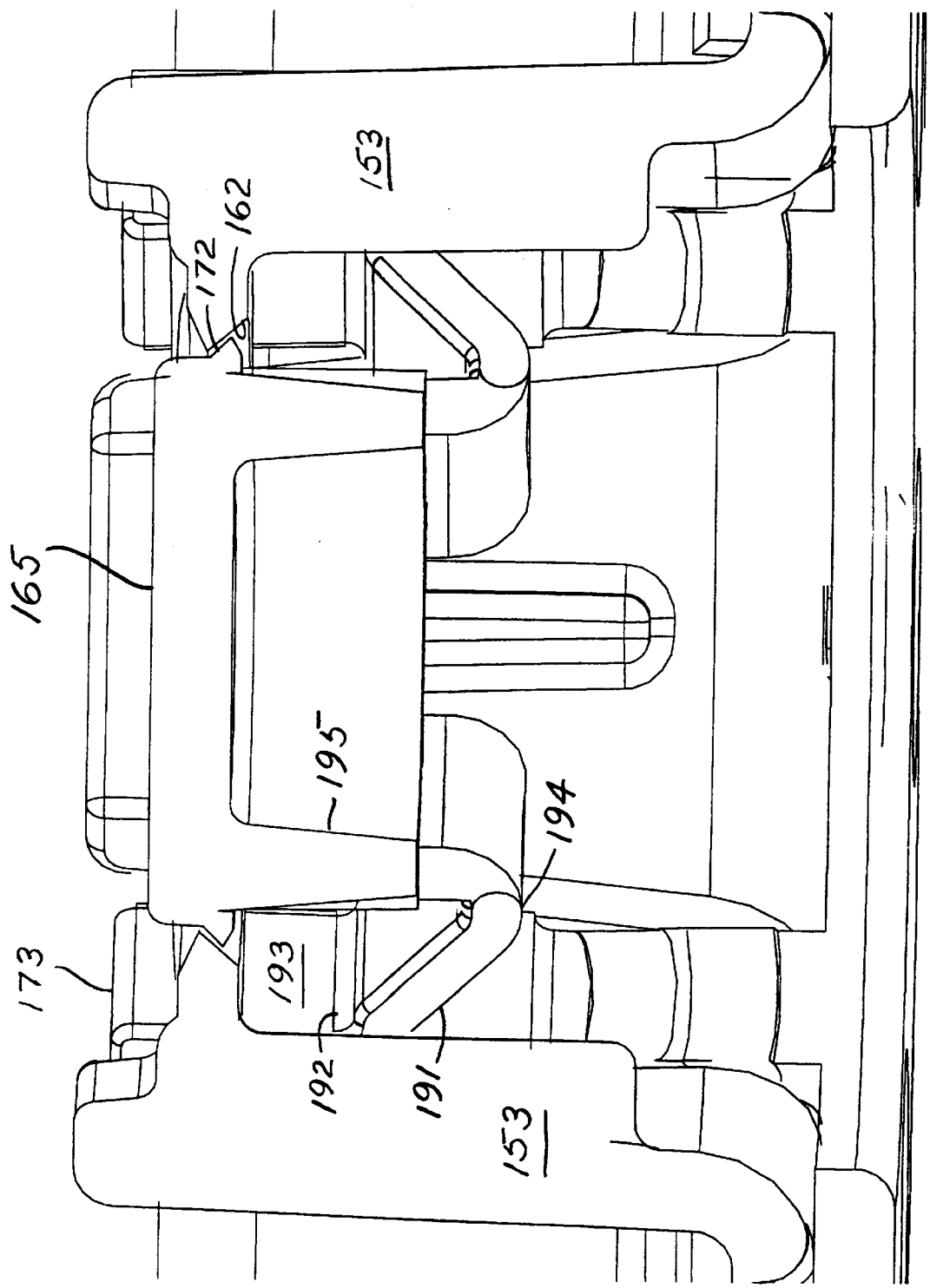
FIG. 5 is a cross-sectional detail through the centering boss showing the push button in an unlocked position.

FIG. 4 shows a sectional view of the push button 165 in the upper locked position, and FIG. 5 shows a sectional view of the push button 165 in the unlocked position. In the locked position shown in FIG. 4, the lock tab detents 171 rest on the upper sloped surfaces 161 of the shelf 159 of the boss. FIG. 4 shows the button 165 in the downward unlocked position in which upper surfaces 172 of the lock tab detents 171 are held beneath the sloped lower surface 162 of the boss shelf 159. Once the button is pushed into the unlocked position shown in FIG. 5, it would be difficult to force the button back into the locked position since the bottom opening of the tray is closed by the cover on which the tray is mounted.

FIGS. 3 and 4 also show the goose neck arms 191 to which the inner surface 193 of the flex arms 173 are attached, and to which also are attached the lower cylindrical extension 195 of the push button 165.

Figure 6:
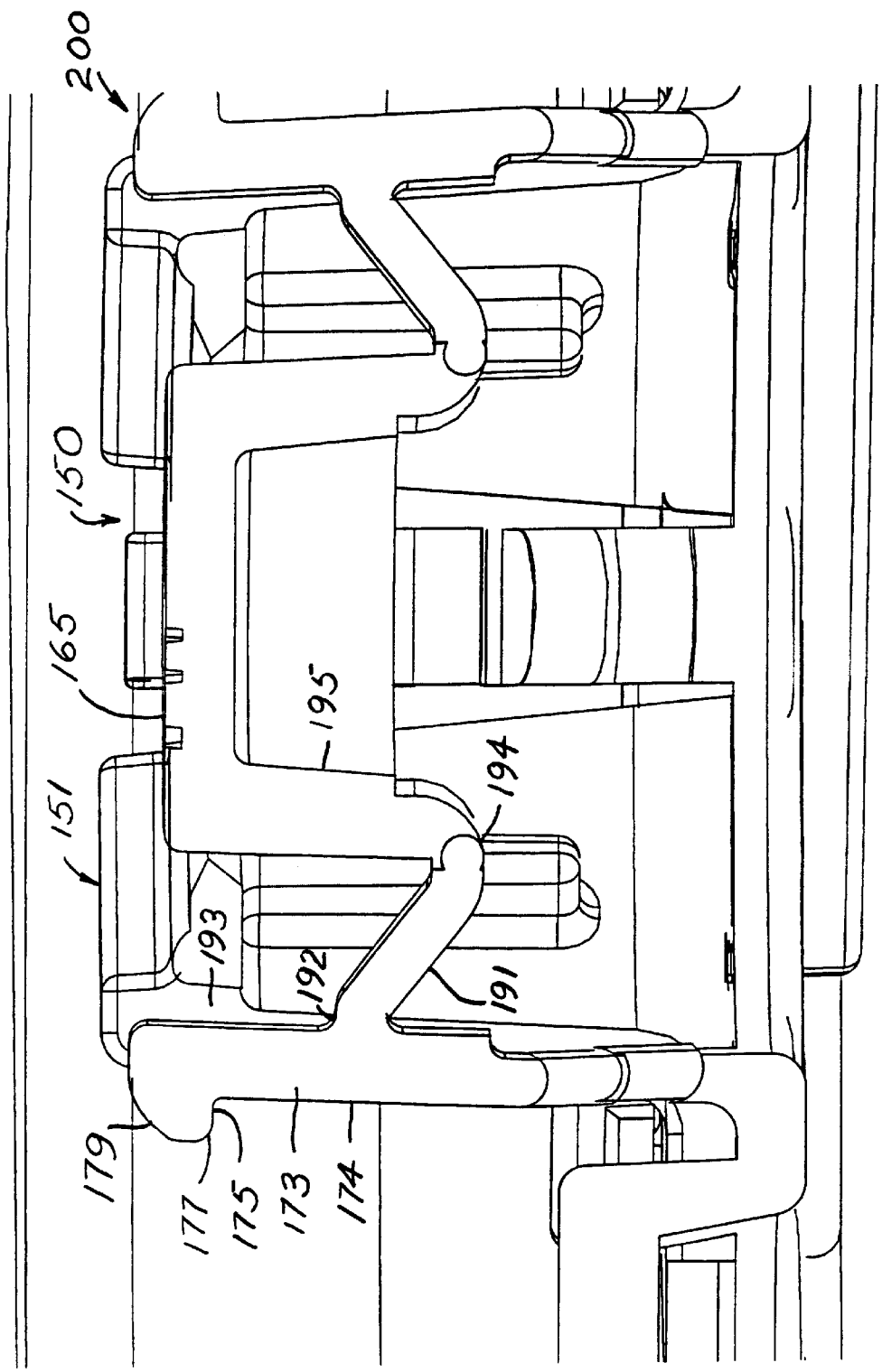
FIG. 6 is a cross-sectional detail showing the push button in a lower unlocked position with the retaining arms drawn inward.

The flex arms 173 and goose neck connectors 191 are shown in cross-section in FIG. 6. The goose necks 191 are connected to the inner surfaces 193 of flex arms 173 with flex portions 192, and the flex arms 191 are connected to the downward extensions 195 of push button 165 with flexing areas. Two flexing areas 196 and 197 are formed at the bottom of the flex arms 173, where the flex arms connect with the bottom 199 of the engineering resin insert 200.

Figure 7:
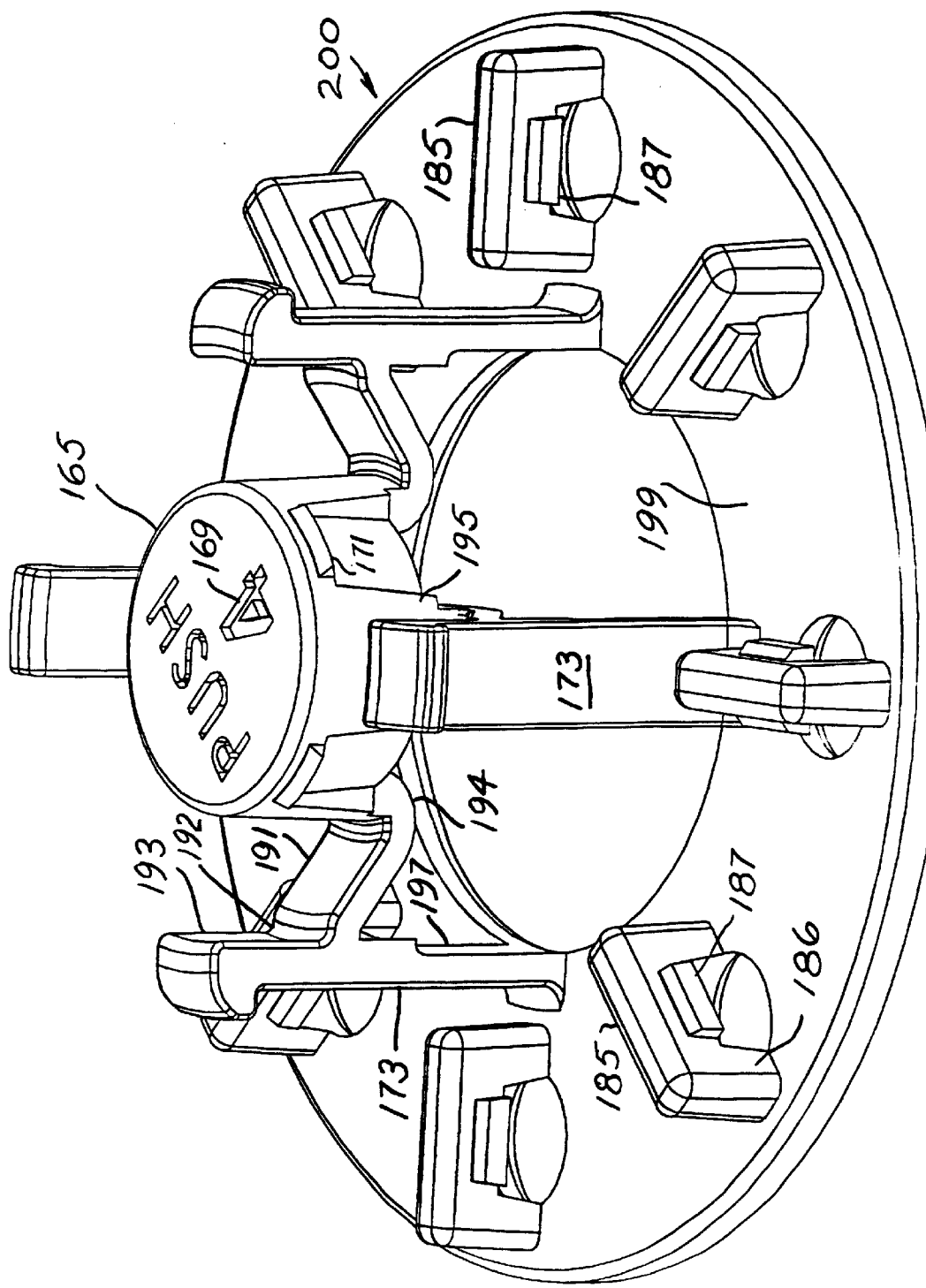
FIG. 7 is a detail of the insert portion made of engineering plastic with the lower circular insert base. The reference surfaces hold the lowermost disc and establish the number of discs held by the retaining extensions.

FIG. 7 shows the engineering resin insert 200, which may be made of a breakage- and impact-resistant resin such as polypropylene, acetyl, nylon, zylar or an acrylic crystal styrene blend with an additive to match the light-reflective index of the tray. The complexity of the insert 200 is made in a common smaller tool, taking it out of the larger tool which is used to mold the tray. The engineering resin insert 200 may be made of a particular color, which may be indicative of the source or content of the discs. The base 199, flex arms 173, goose necks 191 and push button 165 remain constant while the molds may be adjusted for the height of the reference surfaces 185 and the lengths of the side walls 186, which control whether one, two, three or four discs are accommodated by the insert 200. When the height of the reference surfaces 185 is changed, the number 169 on top of the push button is changed to indicate how many discs are held by the insert 200. The advantages that common trays may be molded out of inexpensive crystal styrene material, which is relatively rigid as suitable for the tray and which resists and does not accept repeated bending and is subject to breakage. The trays may be made of the inexpensive material and stored separately, and the smaller flex inserts 200 made of more expensive engineering resins may be inserted in the trays according to the number of discs which will be sold in a set.

Figure 8:
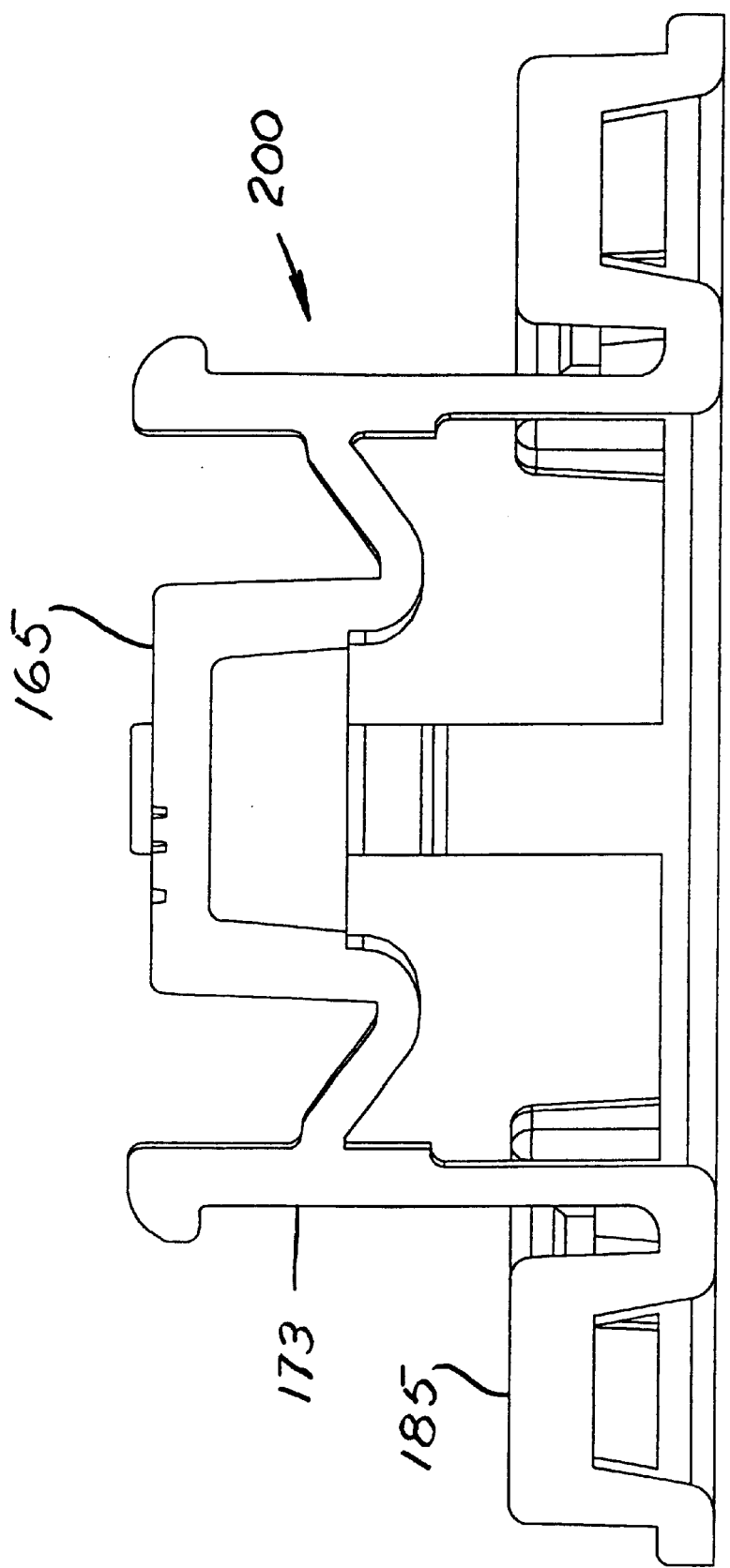
FIG. 8 is a cross-sectional view of the engineering plastic insert shown in the perspective view of FIG. 7.

FIG. 8 is a cross-section of the engineering plastic insert 200 showing the structure which is made without side actions.

Figure 9:
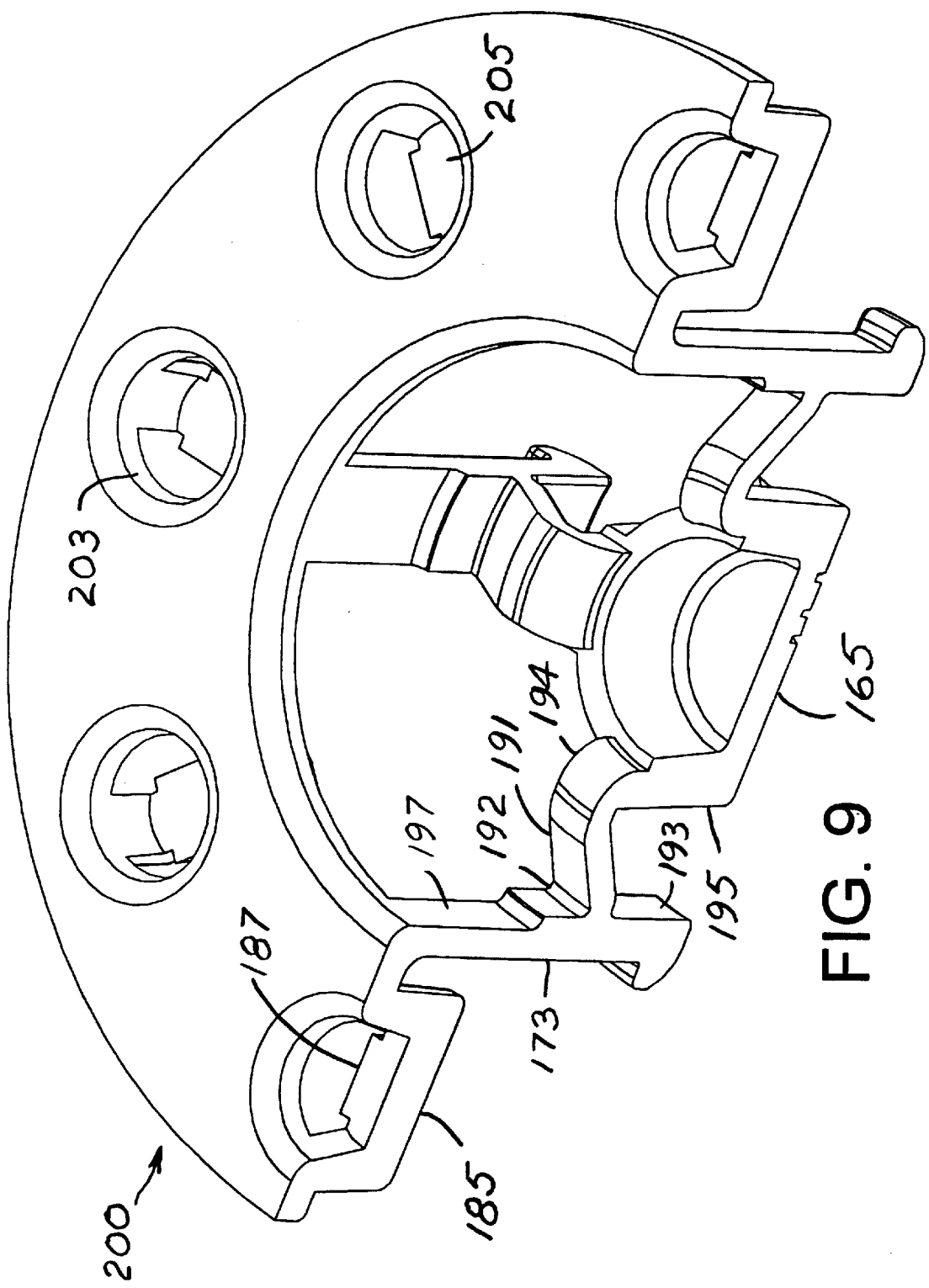
FIG. 9 is an inverted partially cross-sectioned perspective view showing the swipe shut-off openings for forming the snaps to connect the insert to the premolded tray.

FIG. 9 is an inverted, partially perspective and partially cross-sectional bottom view of the insert 200. The openings 203 are used for insertion of the shut-offs which form the bottoms 205 of the reference surfaces and snaps 187.

Figure 10:
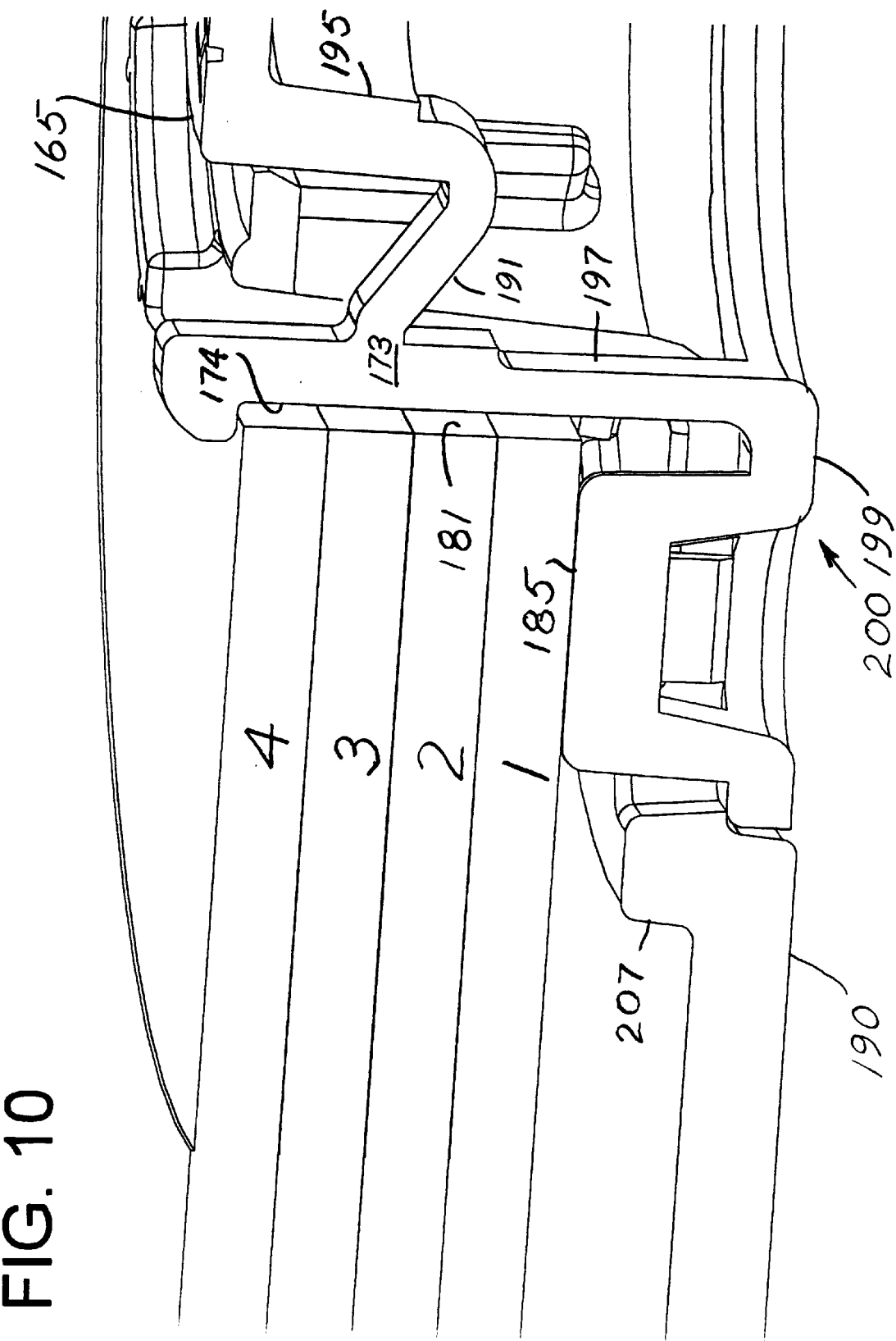
FIG. 10 is a partially cross-sectional view of the tray with the integrally formed boss and the engineering plastic insert.

FIG. 10 shows the engineering resin insert 200 inserted in a central raised annular portion 207 of the tray bottom 190, showing four discs positioned on top of the reference surface 185. There is no contact between the inner openings 181 of the discs and the outer surface 174 of arm 173, either in the locked or unlocked condition.

Figure 11:
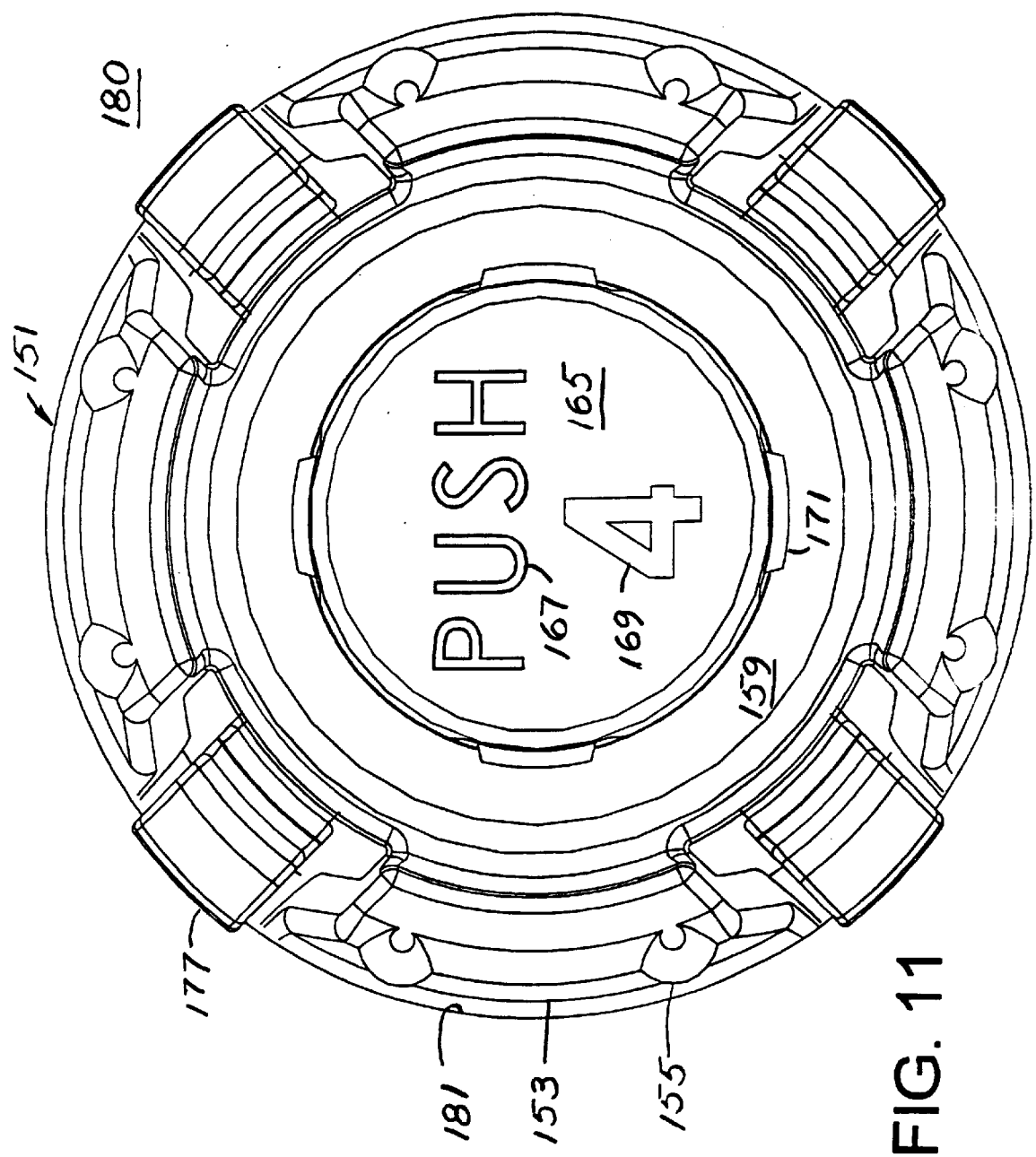
FIG. 11 is a top view of the disc-centering boss, the retaining arms and retaining extensions, and the push button of the insert in its upper locked position.

FIG. 11 is a top view detail of the push button 165 in the locked position on shelf 159 of the boss 151. FIG. 11 shows that there is no contact between the outer surfaces of the boss 151 or the cylindrical extensions 155 with the inner surface 181 of the discs 180 which are held on the boss by the flexible arms.

Figure 12:
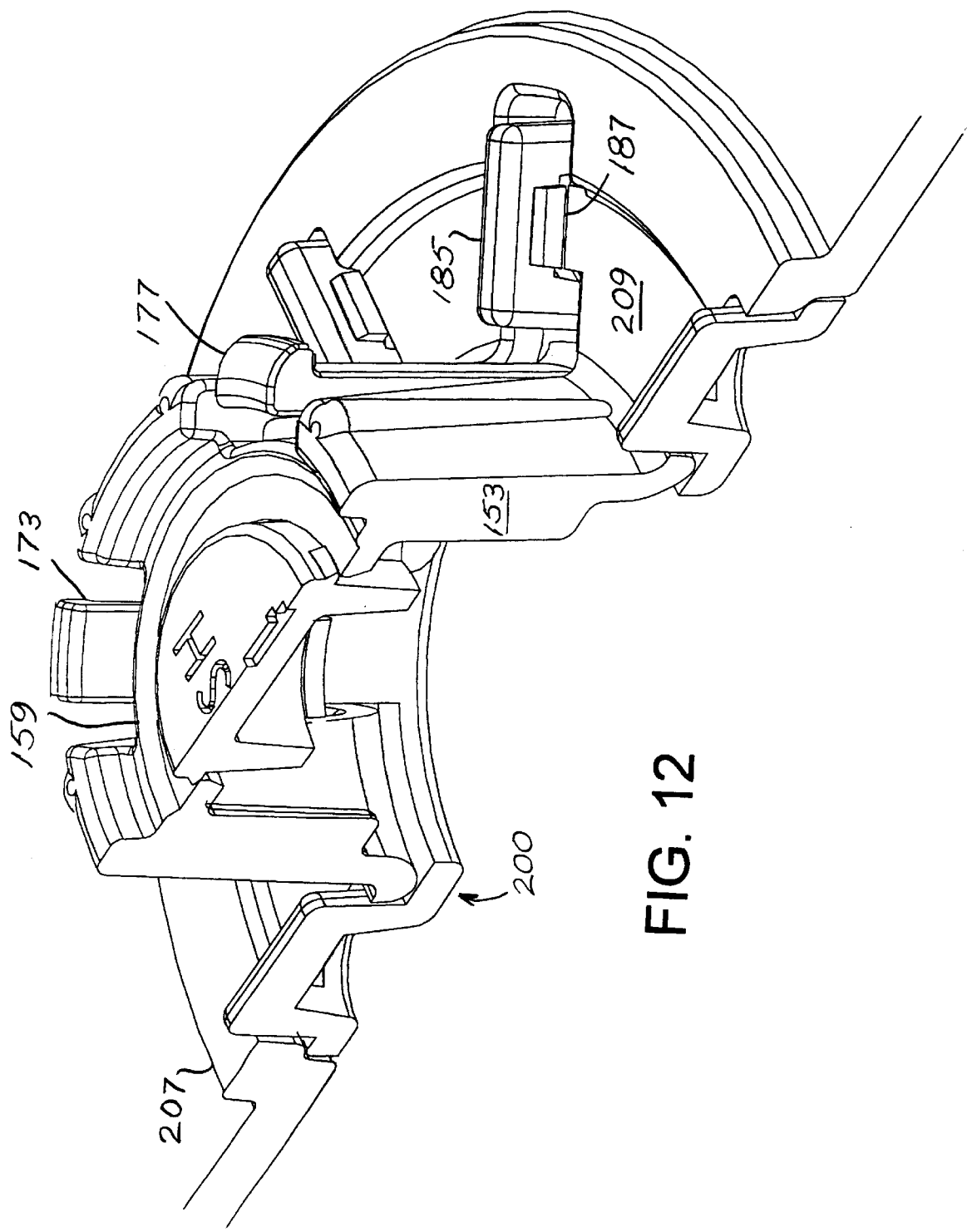
FIG. 12 shows the tray and centering boss in a partially perspective and partially cross-sectional view, with the engineering plastic insert snapped into the tray and the push button in its upper locked position.

FIG. 12 shows a sectional view of the tray and the engineering insert 200 showing how the snaps 187 overlie the annular central surface 209 of the raised portion 207 of the tray, and how the central annular surface 209 is formed integrally with the upstanding boss segments 153. The push button 165 is shown in the locked position in FIG. 12.

Figure 13:
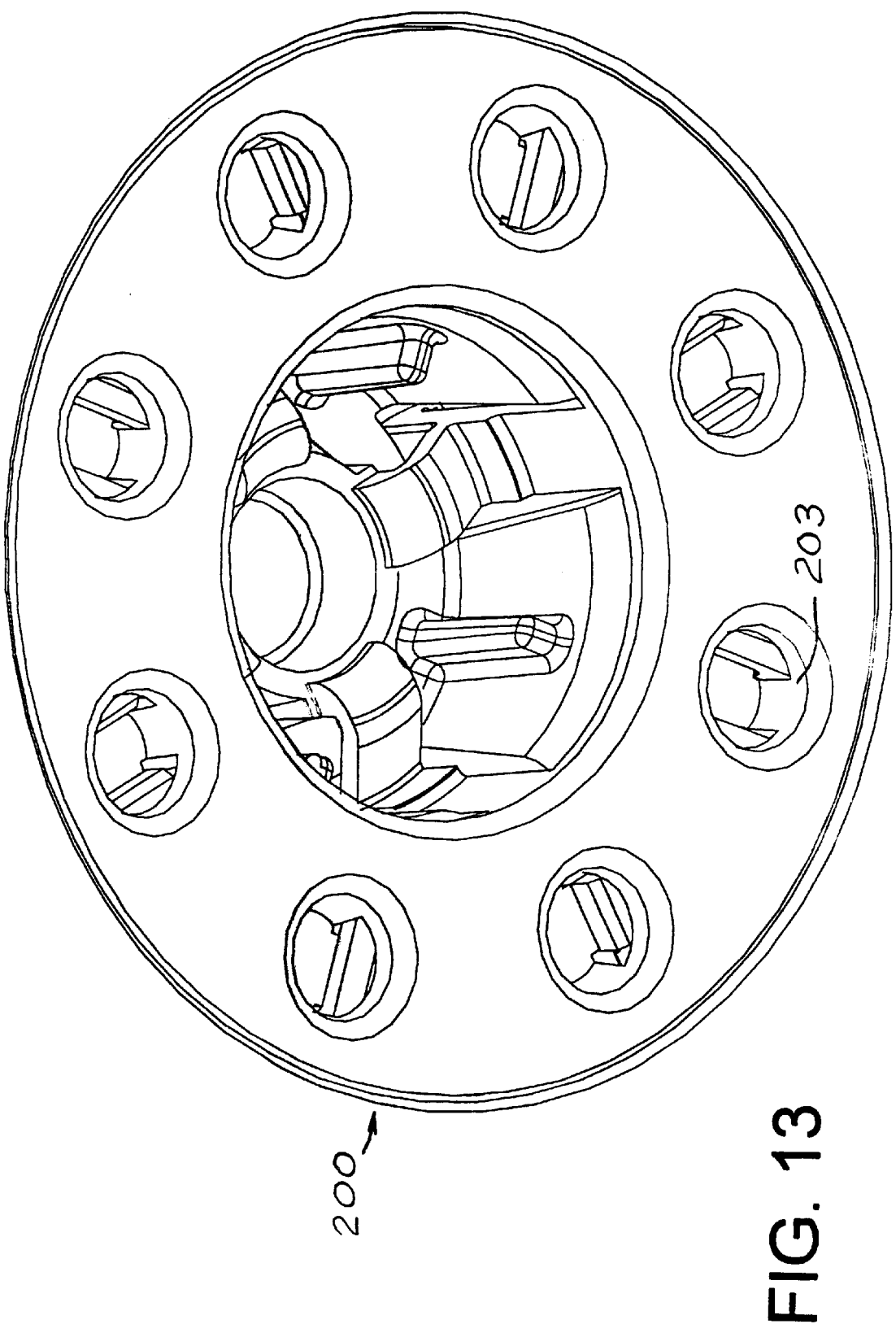
FIG. 13 is a bottom view of the insert positioned in the tray.

FIG. 13 is a bottom view of the engineering insert 200 inserted in the boss 151 of the tray.

Figure 14:
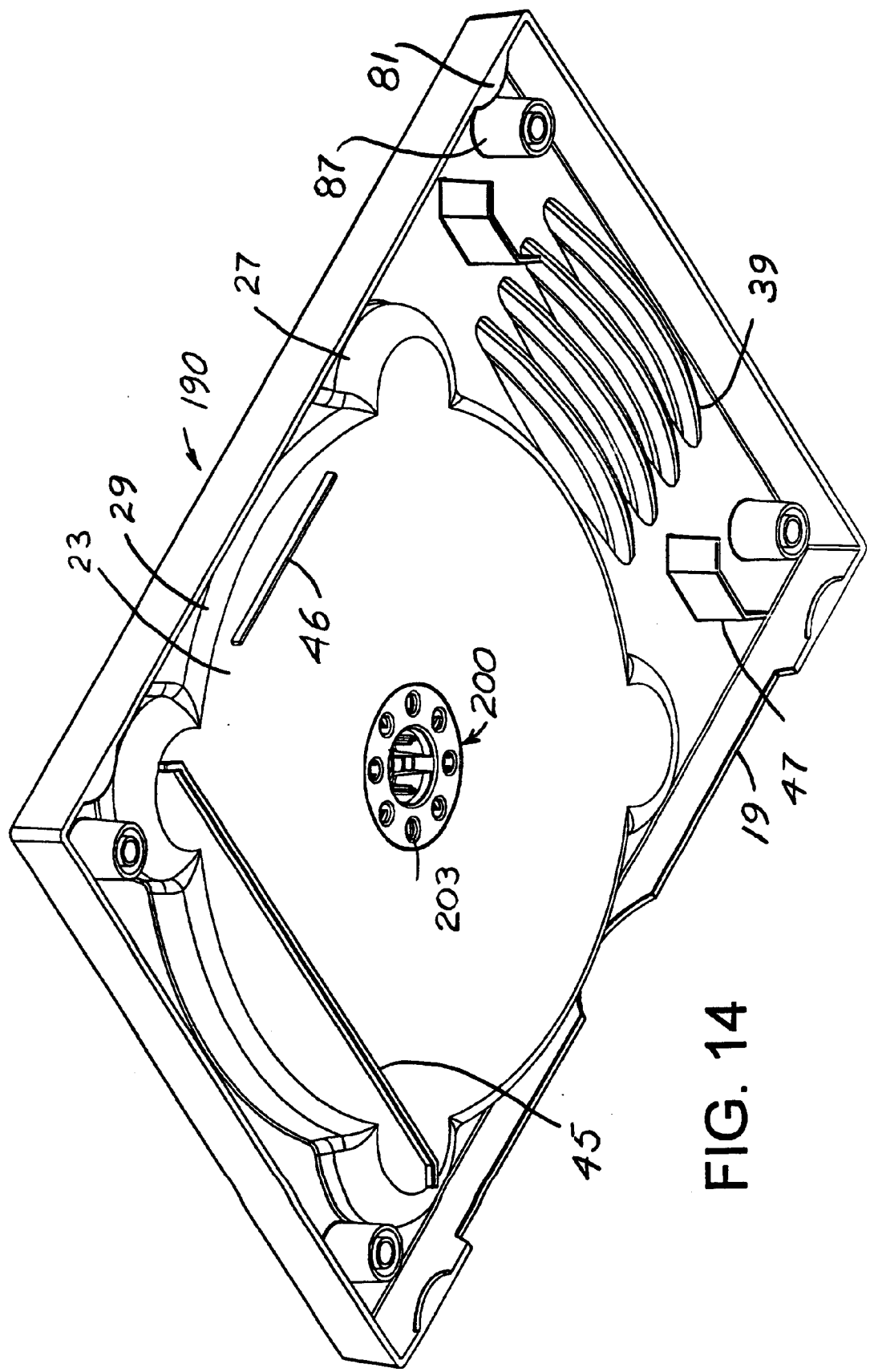
FIG. 14 is an overall perspective bottom view of the tray with the insert positioned in the tray.

FIG. 14 is a bottom view of the tray 190 with the engineering insert 200 inserted. The bottom of the tray has well 23 with side walls 29 for holding the disc, and finger access depressions 27 for enabling lifting of the disc. A booklet slides through opening 19 in one side of the tray and is guided by sides 45 and 47 and stop 46 to limit the booklet insertion.

Tabs 81 hold the bottom of a cover against the tray, and glue bosses 87 hold the cover in engagement with the tabs. Circular depressions 39 are provided to hold discs on edge.

Figure 15:
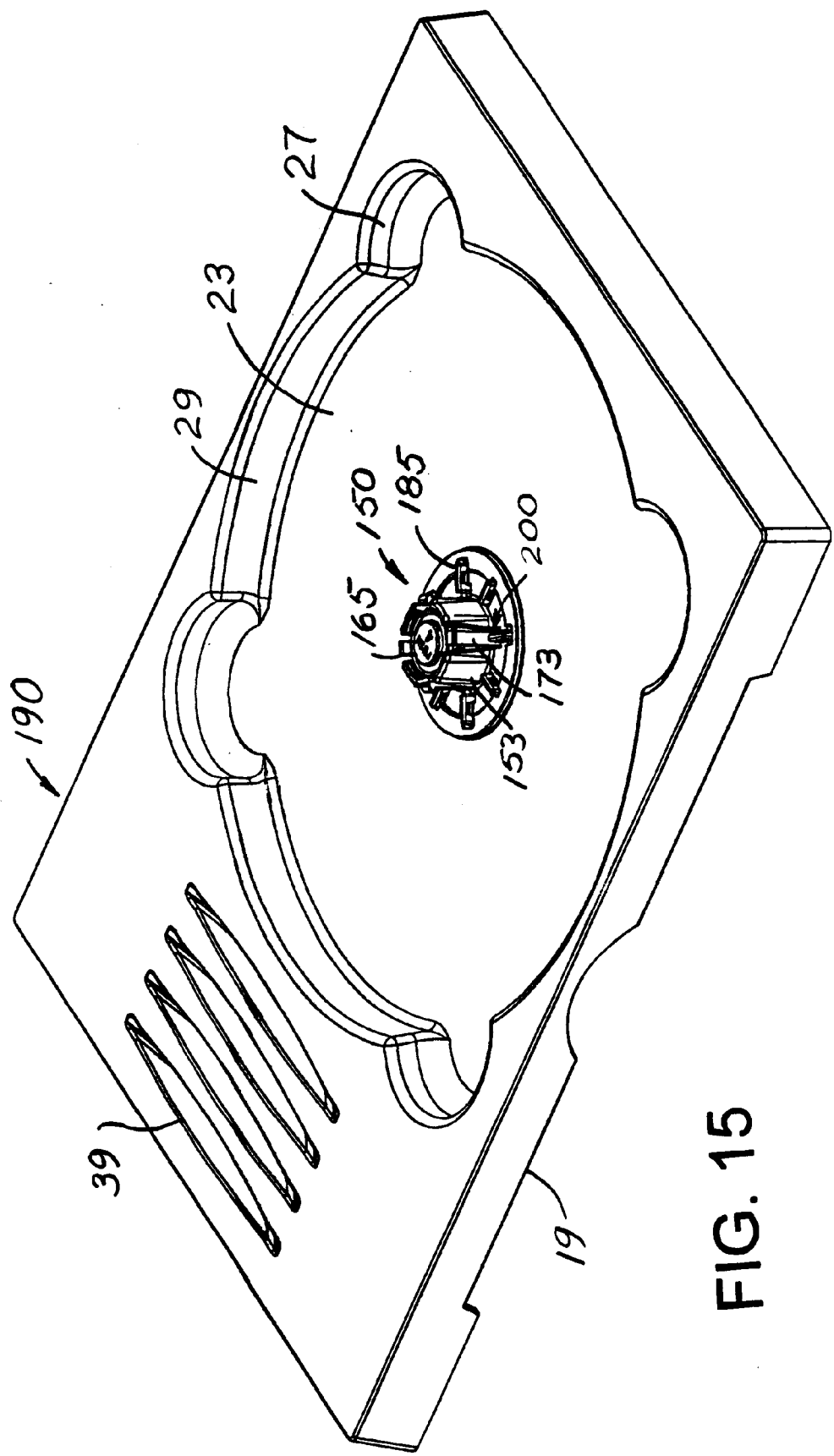
FIG. 15 is an upper perspective view of the tray with the insert positioned in the boss.
Figure 16:
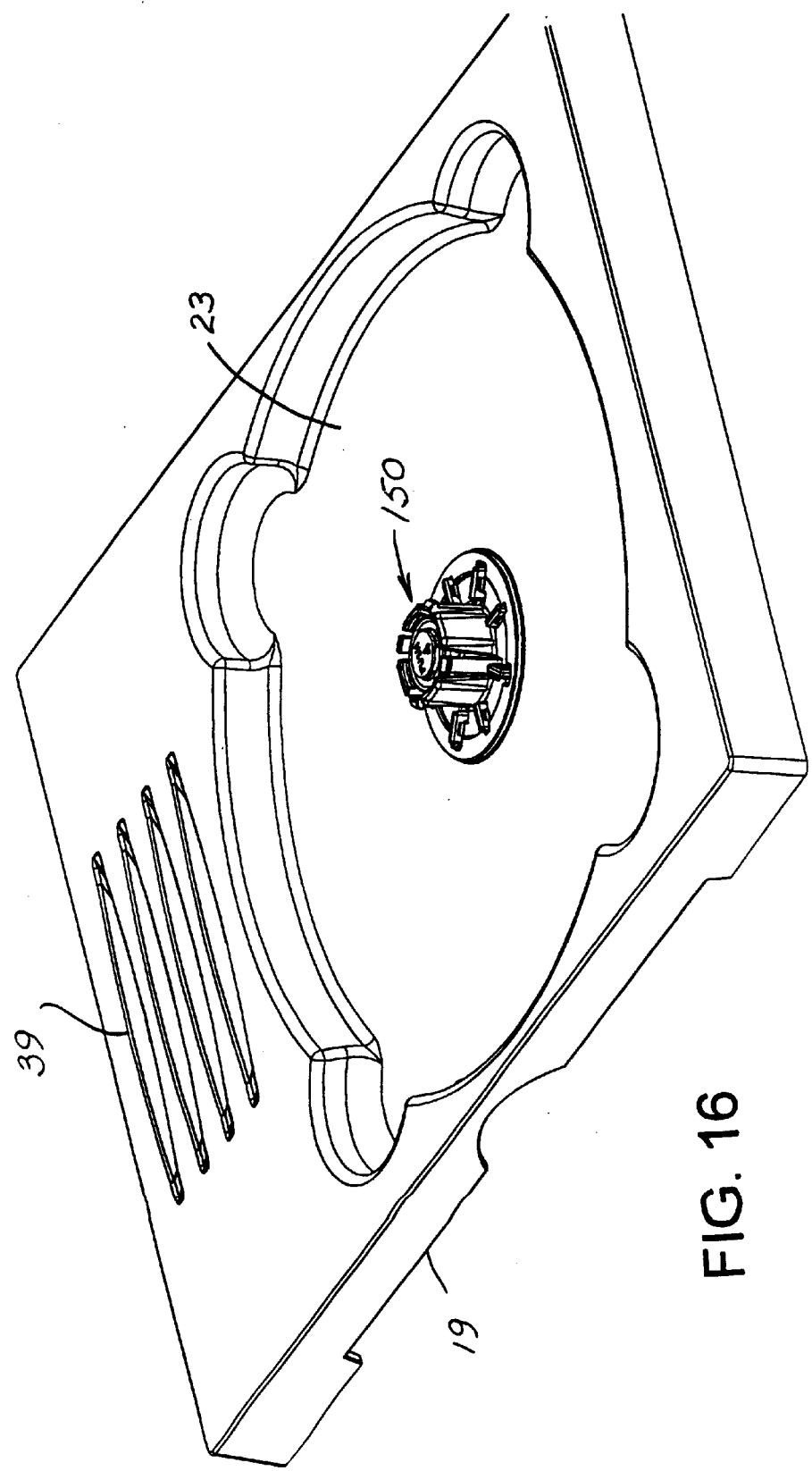
FIG. 16 is an upper perspective view of the tray with the insert positioned in the boss and the push button in its upper locked position.

FIG. 15 and 16 are top perspective views of the tray.

Figure 17:
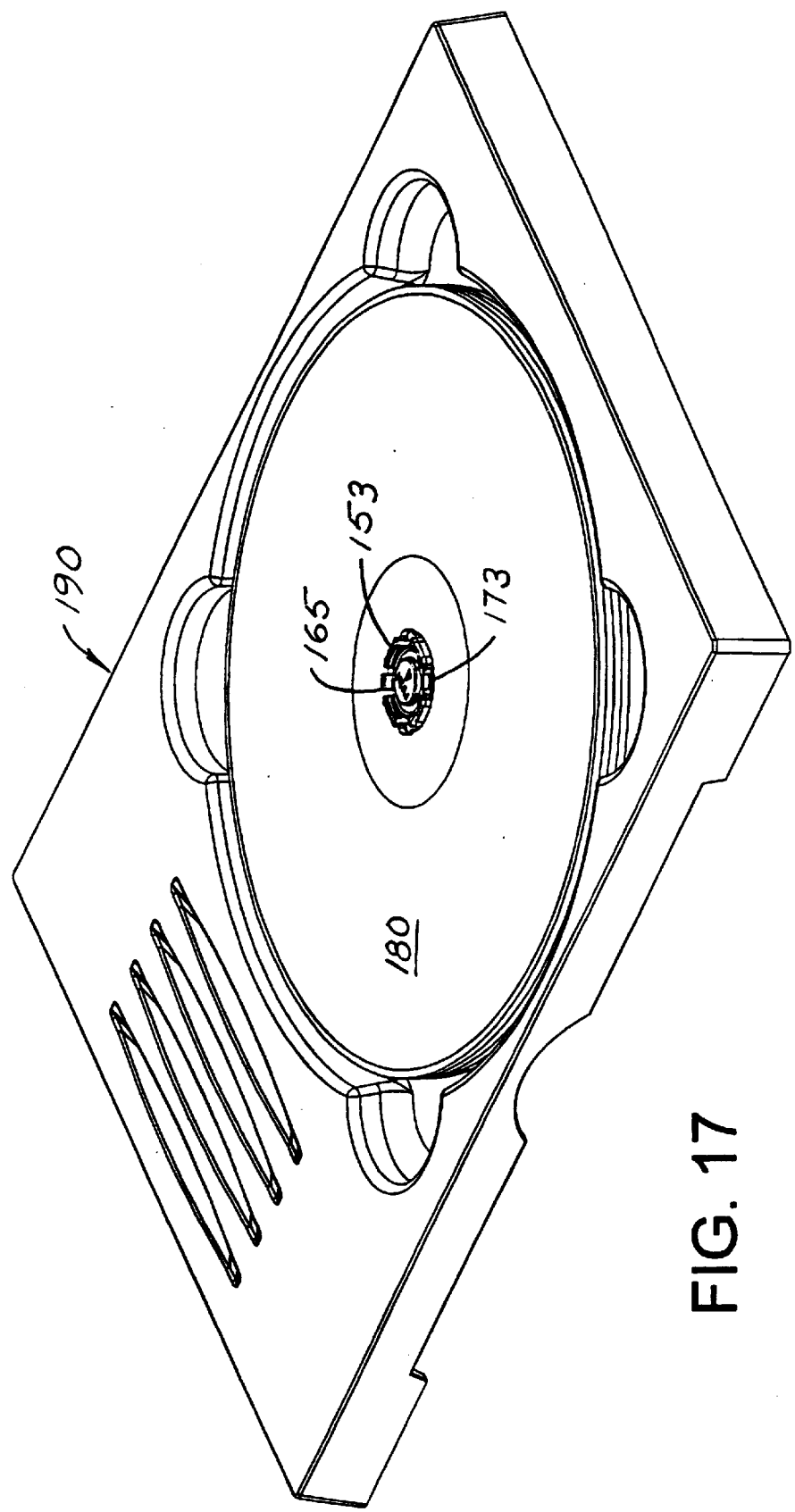
FIG. 17 is a top perspective view of the tray and insert showing four discs positioned on the centering boss and held in place by the retaining extensions.

FIG. 17 shows four discs held within the well of the tray by the flex arms, with the push button in the locked position.

While the invention has been described with reference to specific embodiments, modifications and variations of the invention may be constructed without departing from the scope of the invention, which is defined in the following claims.

I claim:

1. A disc package comprising:
   a rigid tray having a ledge and a central boss extending upward from the ledge for centering discs;
   an inward extending shoulder on an upper portion of the boss;
   a flexible insert snapped into the tray and having a body, and having reference surfaces for supporting a fixed number of discs;
   flexible arms connected to the flexible insert and extended upward along the boss;
   disc-retaining extensions extending outward from tops of the flexible arms for retaining discs;
   connectors extending inward from medial portions of the flexible arms;
   a push button within the boss connected to the connectors for up and down movement in the boss; and
   lock tab detents extending outward from the push button for engaging the inward extending shoulder of the boss.

2. The package of claim 1, wherein the inward extending shoulder further comprises sloped walls for selectively holding the push button in an upward arm locking position and in a downward arm releasing position.

3. The package of claim 1, wherein the connectors comprise goose-neck connectors having first flexible connections to medial portions of the arms and extending downward and inward, and having second connections to the push button.

4. The package of claim 3, wherein the second connections are flexible.

5. The package of claim 3, further comprising outward and downward sloped surfaces on upper surfaces of the disc-retaining extensions, and wherein the goose-neck connectors permit inward movement of the arms when discs are pressed downward on the sloped upper surfaces of the disc-retaining extensions for loading discs on the trays.

6. The package of claim 1, further comprising outward and downward sloped surfaces on upper surfaces of the disc-retaining extensions, and wherein the connectors permit inward movement of the arms when discs are pressed downward on the sloped upper surfaces of the disc-retaining extensions for loading discs on the trays.

7. The package of claim 1, further comprising flexible portions of the arms adjacent connections to the flexible insert for allowing the arms to tip inward.

8. A disc package apparatus comprising:
- a flexible insert for connecting to a tray and having a body, and having reference surfaces for supporting a disc;
- flexible arms connected to the flexible insert for extending upward along a boss;
- disc-retaining extensions extending outward from tops of the flexible arms for retaining discs;
- connectors extending inward from medial portions of the flexible arms;
- a push button near the boss connected to the connectors for up and down movement along the boss; and
- lock tab detents extending outward from the push button for engaging an inward extending shoulder of the boss.

9. The package apparatus of claim 8, wherein the detents further comprise sloped outer walls for selectively holding the push button in an upward arm locking position and in a downward arm releasing position.

10. The package apparatus of claim 9, wherein the connectors comprise goose-neck connectors having first flexible connections to medial portions of the arms and extending downward and inward, and having second connections to the push button.

11. A method for loading, holding and releasing discs from a package, comprising:
- providing a rigid tray with a ledge and a central boss extending upward from the ledge for centering discs;
- providing an inward extending shoulder on an upper portion of the boss;
- providing a flexible insert, snapped into the tray and having a body, and having reference surfaces for supporting a fixed number of discs;
- providing flexible arms connected to the flexible insert and extended upward along the boss;
- providing disc-retaining extensions extending outward from tops of the flexible arms for retaining discs;
- providing connectors extending inward from medial portions of the flexible arms;
- providing a push button within the boss connected to the connectors for up and down movement in the boss; and
- providing lock tab detents extending outward from the push button for engaging the inward extending shoulder of the boss.

12. The method of claim 11, wherein the providing inward extending shoulder further comprises providing sloped walls on the shoulder and selectively holding the push button in an upward arm locking position and in a downward arm releasing position.

13. The method of claim 11, wherein the providing connectors comprises providing goose-neck connectors having first flexible connections to medial portions of the arms and extending the goose-neck connectors downward and inward to second connections to the push button.

14. The method of claim 13, wherein the second connections are flexible.

15. The method of claim 13, further comprising providing outward and downward sloped surfaces on upper surfaces of the disc-retaining extensions, and wherein the goose-neck connectors permit inward movement of the arms when discs are pressed downward on the sloped upper surfaces of the disc-retaining extensions for loading discs on the trays.

16. The method of claim 11, further comprising providing outward and downward sloped surfaces on upper surfaces of the disc-retaining extensions, and permitting inward movement of the arms when discs are pressed downward on the sloped upper surfaces of the disc-retaining extensions for loading discs on the trays.

17. The package of claim 11, further comprising providing flexible portions of the arms adjacent connections to the flexible insert, and allowing the arms to tip inward.

18. A method of holding discs on a tray, comprising:
- pushing discs downward over sloped upper surfaces on outward extensions of flexible arms;
- holding discs downward with lower horizontal surfaces on the extensions;
- moving upper portions of the arms inward by pushing downward with a first force on a central push button connected to the arms;
- initially locking the push button upward in a locking position with an inward shoulder on a centered boss on the tray;
- overcoming a holding force of the shoulder by pushing downward on the push button with a second force greater than the first force for releasing the locking;
- returning the arms outward with resilient force from the arms;
- returning the push button upward with the resilient force for returning the arms outward; and
- stopping the push button with the shoulder and preventing further upward travel beyond the shoulder into the initial locking position of the of the push button.

* * * * *